Oct. 9, 1934. J. C. WHITESELL, JR 1,975,997

METHOD OF WELDING

Filed June 15, 1932

INVENTOR.
John C. Whitesell Jr,
BY
John P. Tarbox
ATTORNEY.

Patented Oct. 9, 1934

1,975,997

UNITED STATES PATENT OFFICE 1,975,997

METHOD OF WELDING

John C. Whitesell, Jr., Norristown, Pa., assignor to Edward G. Budd Manufacturing Company, Philadelphia, Pa., a corporation of Pennsylvania Application June 15, 1932, Serial No. 617,311

7 Claims. (Cl. 219—10)

My invention relates to welding and more particularly to a method of welding structures or sheet metal parts of such a type that it is highly impractical to control the positioning of the electrodes upon opposite sides of the work in opposed substantial alignment from one station or position.

In the welding of structures such as boats, airplanes, etc. it is found that many times, for instance in the securing of the skin of the fuselage to the various supporting framework, the opposite electrodes have to be positioned by two separate operators because the structure is of such formation that mechanical arms or other well known means of aligning the electrodes cannot be used.

I overcome the above-mentioned obstacles and attain substantial uniformity of operation and uniformity of the welds by means of my method which comprises connecting the electrodes in, or in juxtaposition to, an indicia circuit such that an indication is obtained when the relatively opposed electrodes are finally placed substantially in alignment.

My invention will be better understood from the following description when considered in connection with the accompanying drawing and its scope will be pointed out in the appended claims.

Figure 1:
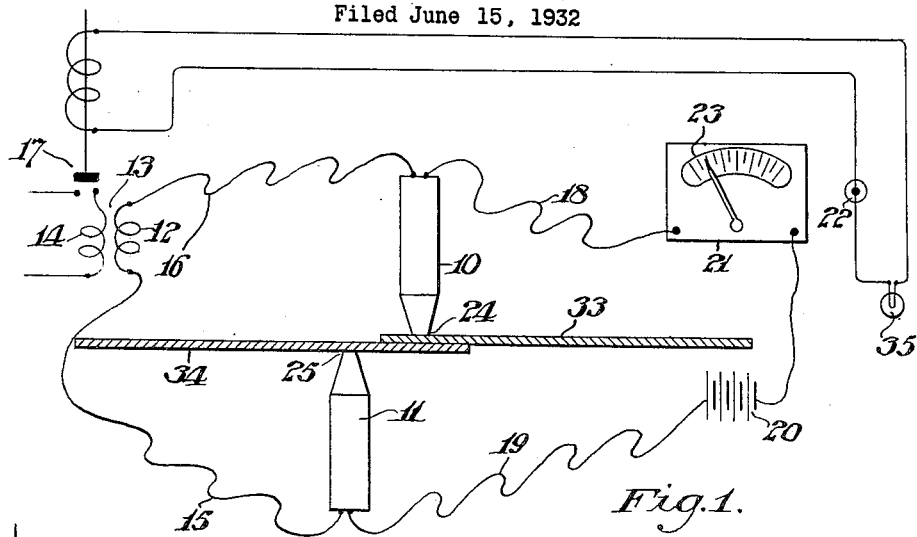
Figure 1 shows a system in initial position prior to the alignment of the electrodes.

Referring to the apparatus in more detail, the welding electrodes 10 and 11 are energized from the transformer 13 by means of flexible leads 15 and 16 connected to the secondary circuit 12. The primary side 14 of the transformer is energized by any suitable source of power through the circuit breaker 17. As shown in Fig. 1 the indicia circuit is connected to the electrodes and comprises in its most simple form the leads 18 and 19, a source of energy, for example, a battery 20, and an indicating mechanism, here shown as a meter 21. The electrode 10 is placed in position at one side of the work at the point wherein the weld is to be made. The meter is placed adjacent the electrode 10, as is also a push button switch 22 used to energize the primary circuit of the welding transformer. The indication 23 on the meter 21 shows a reduced scale reading because of the shown non-alignment of the electrodes and because of the large circuit resistance in the path between the points 24 and 25.

Figure 2:
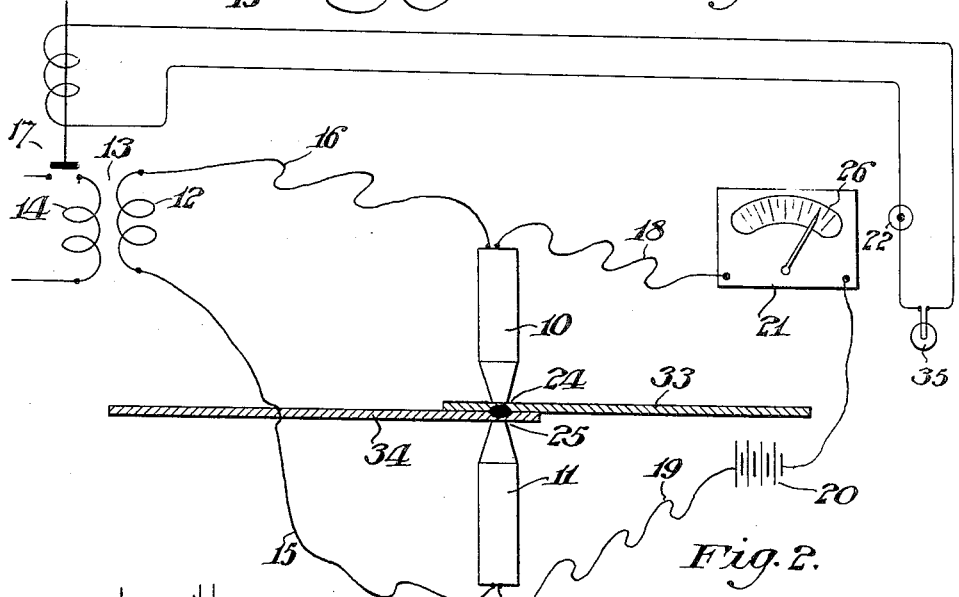
Figure 2 shows the electrodes in aligned position.

In Fig. 2 the electrode 11 has been moved by an operator upon the opposite side of the workpiece into a position of substantial alignment with electrode 10, wherein the meter 21 gives an indication 26 substantially greater than the indication 23 in Fig. 1. This is readily apparent inasmuch as the circuit resistance between the points 24 and 25 in this figure is substantially less than the circuit resistance between the points 24 and 25 of Fig. 1. It is obvious that this indicia circuit may be arranged in such a manner that the indicator may give a reading in accordance with the Null method of measurement, or it may be so connected as to give a minimum reading at the point of opposed alignment, for example, by having the meter in a parallel circuit to the main indicia circuit. The energy and current relations in the circuit including the electrodes then bucks or opposes the voltage and current relations in the meter circuit under these circumstances a condition of maximum current through the electrode portion of the indicia circuit would result in a reduced reading of the meter.

Figure 3:
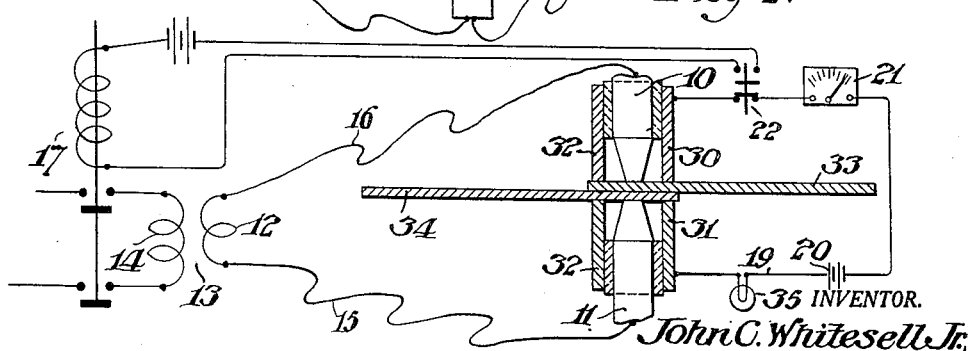
Figure 3 shows a slight modification wherein the contact of the indicia circuit is not through the welding electrodes but is by means of a separate contact member mounted in juxtaposition to the welding electrode.

In Fig. 3 a slightly modified arrangement is used accomplishing by my method and in this instance the electrodes 10 and 11 are again associated with the secondary circuit of the welding transformer 13. Herein the contacts of the indicia circuit comprising the members 30 and 31 are insulated from the electrodes by insulating sleeves 32 and are concentric with the electrodes. In this form the push button 22 is shown as controlling a double circuit connection, one of which breaks the indicia circuit prior to the closing of the welding circuit. The meter 21 and the battery 20, with leads 19 and 18 are the same as previously used. The electrodes are again on opposite sides of the workpieces 33 and 34.

In this system an indication is again on the meter at 21 near the relatively fixed electrode and an indicator of some form 35 is placed in close relation to the electrode on the opposite side of the work. In this system when a suitable indication on the meter 21 occurs the indicator 35 will likewise inform the electrode operator on the opposite side of the workpiece that the proper condition for welding has occurred. The operator on the side of the work having the meter 21 and the push button 22 will thereupon operate the push button energizing the welding circuit and either before or simultaneously therewith de-energizing the indicia circuit. This de-energization of the indicia circuit will be such as to inform the operator remote from the control side of the work that the weld is to be made and he will not further move the electrode to obtain any additional new position.

It is readily apparent that the apparatus and circuit connections are subject to numerous modifications and I do not necessarily aim to explain all such modifications which would necessarily be within the scope of my method. The forms shown are sufficient for explanation of the method and I do not believe it is necessary to go into further detail. It is also obvious that the switching system of Fig. 3 is more essential to an arrangement as of Figs. 1 and 2 wherein the indicia circuit passes through the electrodes themselves. However, there is no sufficient reason why it should not be used and any slight modifications of it are deemed useful to my method.

Modifications of the invention will be obvious to those skilled in the art and I do not, therefore, wish to be limited except by the scope of my sub-joined claims as interpreted in the light of the generic spirit of my invention.

What I claim is:

1. The method of welding sheets or structures of the type such that it is impractical to control the positioning of both electrodes from one station which comprises connecting said electrodes in an indicia circuit such that an indication is obtained when the relatively opposed electrodes are placed substantially in alignment, adjusting said electrodes until said indication shows them to be substantially aligned and then passing a welding current through said electrodes.

2. The method of welding sheets or structures of the type such that it is impractical to control the positioning of both electrodes from one station which comprises connecting said electrodes in an indicia circuit such that an indication is obtained when the relatively opposed electrodes are placed substantially in alignment moving one of said electrodes until said indication shows said electrodes to be in substantial alignment and thereupon energizing said welding electrode circuit.

3. The method of welding sheets or structures of the type such that is is impractical to control the positioning of both electrodes from one station which comprises connecting said electrodes in an indicia circuit such that a maximum indication is obtained when the relatively opposed electrodes are placed substantially in alignment moving one of said electrodes until said indication shows said electrodes to be in substantial alignment and thereupon energizing said electrode circuit.

4. The method of welding sheets or structures of the type such that it is impractical to control the positioning of both electrodes from one station which comprises connecting an indicia circuit to said electrodes independently of the electrode power circuit in such a manner that an indication is obtained when the electrodes are substantially aligned upon opposite sides of the work pieces moving said electrodes relatively until said indication shows them to be substantially axially aligned and then energizing the welding circuit to make a weld.

5. An indicia system for use in the welding of sheets or structures such that it is impractical to mechanically control the opposed welding electrodes from one position which comprises electrodes arranged for opposed positioning, a welding circuit including said electrodes, an indicia circuit including contacts arranged in juxtaposition to said electrodes and containing means adapted to indicate the condition of substantial alignment of said electrodes, and means arranged to energize said welding circuit.

6. An indicia system for use in the welding of sheets or structures such that it is impractical to mechanically control the opposed welding electrodes from one position which comprises electrodes arranged for opposed positioning, a welding circuit including said electrodes, an indicia circuit including contacts arranged in juxtaposition to said electrodes and containing means adapted to indicate the condition of substantial alignment of said electrodes, and means arranged to energize said welding circuit and to simultaneously deenergize said indicia circuit.

7. The method of welding sheets or structures of the type such that it is impractical to control the positioning of both electrodes from one station which comprises connecting an indicia circuit to contacts in juxtaposition to the welding electrodes and arranged to give an indication when the electrodes are in substantially opposed alignment, moving said electrodes until said indication shows them to be in substantial axial alignment and thereupon energizing said electrodes whereby to make a weld.

JOHN C. WHITESELL, Jr.